US007124515B2

(12) United States Patent
Juenemann

(10) Patent No.: US 7,124,515 B2
(45) Date of Patent: Oct. 24, 2006

(54) MAGNETIC TIP FOR TAPE MEASURE AND METHOD OF USE

(76) Inventor: Michael Juenemann, 7126 Timothy St., Anchorage, AK (US) 99502

( * ) Notice: Subject to any disclaimer, the term of this patent is extended or adjusted under 35 U.S.C. 154(b) by 0 days.

(21) Appl. No.: 10/703,913

(22) Filed: Nov. 7, 2003

(65) Prior Publication Data

US 2004/0181959 A1    Sep. 23, 2004

Related U.S. Application Data

(63) Continuation-in-part of application No. 09/686,649, filed on Oct. 10, 2000, now Pat. No. 6,678,967.

(60) Provisional application No. 60/164,475, filed on Nov. 10, 1999.

(51) Int. Cl.
*G01B 3/10* (2006.01)
(52) U.S. Cl. .......................................... 33/758; 33/770
(58) Field of Classification Search ................ 33/758, 33/770, 760, DIG. 1
See application file for complete search history.

(56) References Cited

U.S. PATENT DOCUMENTS

| | | | | | |
|---|---|---|---|---|---|
| 2,663,941 | A | * | 12/1953 | Dart | 33/768 |
| 3,036,791 | A | * | 5/1962 | Siggelkow | 242/379.2 |
| 3,109,242 | A | * | 11/1963 | Nyitrai | 33/537 |
| 3,145,477 | A | * | 8/1964 | Morrison | 33/770 |
| 4,352,244 | A | * | 10/1982 | Tomuro | 33/757 |
| 4,353,167 | A | * | 10/1982 | Martin | 33/770 |
| 4,580,347 | A | * | 4/1986 | McKnight | 33/760 |
| 4,827,622 | A | * | 5/1989 | Makar | 33/770 |
| 4,924,597 | A | * | 5/1990 | Tursi | 33/758 |
| 5,006,799 | A | * | 4/1991 | Pfanstiehl | 324/230 |
| 5,046,262 | A | * | 9/1991 | Kerbaugh | 33/644 |
| 5,103,574 | A | * | 4/1992 | Levy | 33/760 |
| 5,402,583 | A | * | 4/1995 | Komura | 33/758 |
| 5,421,100 | A | * | 6/1995 | Leore | 33/770 |
| 5,481,813 | A | * | 1/1996 | Templeton | 33/758 |
| 5,544,420 | A | * | 8/1996 | Choi | 33/760 |
| 5,815,940 | A | * | 10/1998 | Valentine, Sr. | 33/770 |
| 6,070,338 | A | * | 6/2000 | Garity | 33/760 |
| 6,073,983 | A | * | 6/2000 | Schroeder | 294/65.5 |
| 6,115,931 | A | * | 9/2000 | Arcand | 33/668 |
| 6,226,886 | B1 | * | 5/2001 | Lamond et al. | 33/769 |
| 6,370,790 | B1 | * | 4/2002 | Stenger | 33/758 |
| 6,442,863 | B1 | * | 9/2002 | Poineau et al. | 33/758 |
| 6,546,644 | B1 | * | 4/2003 | Poineau et al. | 33/758 |
| 6,637,126 | B1 | * | 10/2003 | Balota | 33/770 |
| 6,678,967 | B1 | * | 1/2004 | Jueneman | 33/758 |

FOREIGN PATENT DOCUMENTS

| CN | 2247794 Y | | 2/1997 |
|---|---|---|---|
| DE | 3141635 A | * | 4/1983 |

(Continued)

OTHER PUBLICATIONS

Derwent Abstract 2002-501799, Abstract of DE 20200167Ui published Apr. 2002, title "Hook arrangement for a tape measure with a magnetic hook".*

(Continued)

*Primary Examiner*—R. Alexander Smith
(74) *Attorney, Agent, or Firm*—Angenehm Law Firm; N. Paul Friederichs

(57) ABSTRACT

A measuring device including a mechanism for measuring such as a tape measure, the mechanism for measuring having a end hook; and a mechanism for selectively securing, such as a magnet, the tape to an object, such as a pipe, the mechanism for selective securing being attached to the end hook of the mechanism for measuring.

18 Claims, 16 Drawing Sheets

FOREIGN PATENT DOCUMENTS

| | | | | |
|---|---|---|---|---|
| FR | 2492519 | A | * | 4/1982 |
| JP | 59120902 | A | * | 7/1984 |
| JP | 06281401 | A | * | 10/1994 |
| JP | 2004271252 | A | * | 9/2000 |
| JP | 2003121103 | A | * | 4/2003 |
| JP | 2004239787 | A | * | 8/2004 |
| JP | 2005292086 | A | * | 10/2005 |
| TW | 405703 | | | 9/2000 |
| WO | WO 200135048 | A | * | 5/2001 |
| WO | WO 3052344 | A1 | * | 6/2003 |

OTHER PUBLICATIONS

Federal Specification GGG-T-106F dated Apr. 12, 1993.*
Notice of Cancelation for Federal Specification GGG-T-106F, dated Jul. 13, 1999.*

* cited by examiner

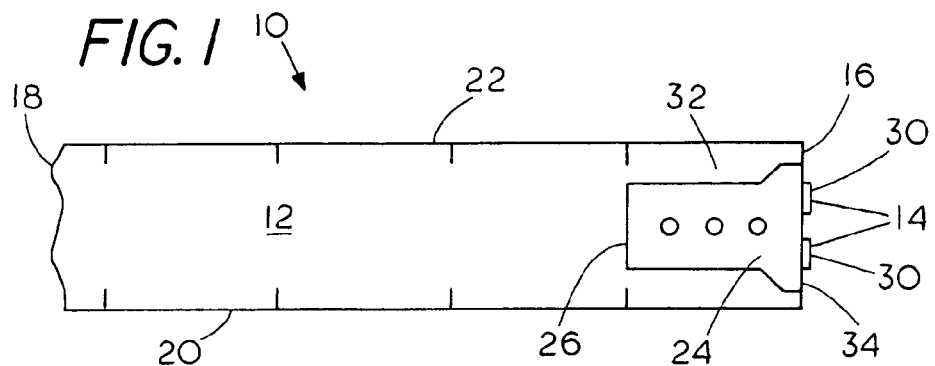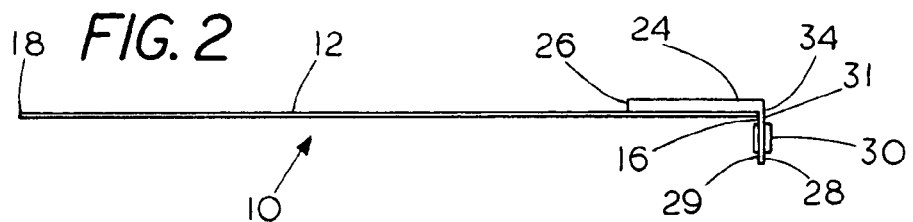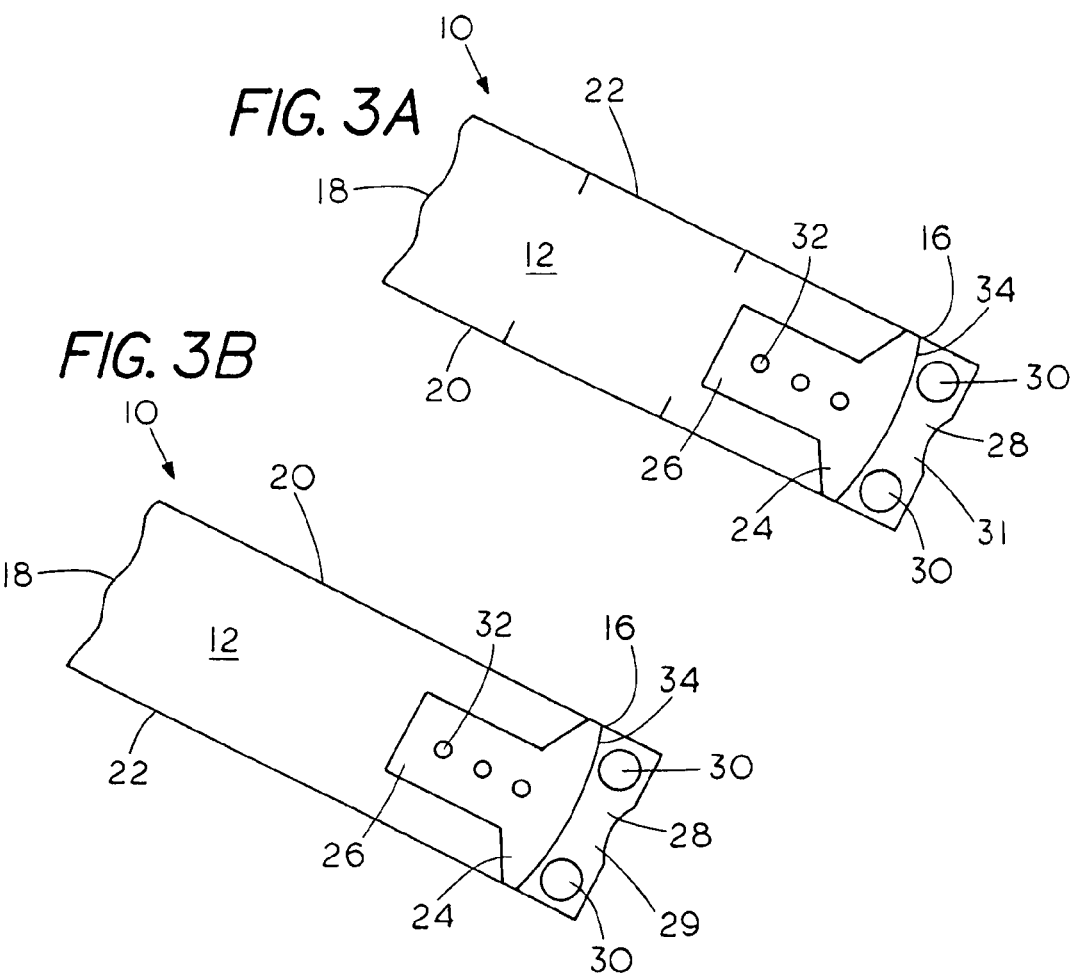

MAGNETIC TIP FOR TAPE MEASURE AND METHOD OF USE

The present application is a continuation-in-part of and claims from application Ser. No. 09/686,649, entitled MAGNETIC TIP FOR TAPE MEASURE AND METHOD OF USE, filed Oct. 10, 2000; provisional patent application No. 60/164,475, entitled MAGNETIC TIP FOR TAPE MEASURE AND METHOD OF USE, filed Nov. 10, 1999 and from patent application Ser. No. 09/541,491, entitled MAGNETIC TIP FOR TAPE MEASURE AND METHOD OF USE, filed Apr. 3, 2000. This invention relates to measuring devices, specifically to such devices with an active mechanism for attachment to the object being measured.

FIELD OF INVENTION

Background

People use and have used measuring devices for a very long time. Some measuring devices that are used today are tape measures and rulers. When a person is measuring a long distance (more than 12 inches) usually that person will use a tape measure.

Typical tape measures range from a few feet to considerably more than one hundred feet. Tape measures commonly have a tip, or end hook, at one end of the tape. The end hook is placed at one end of a board, pipe, or other object being measured. The end hook is generally ½ inch to ¾ inch long.

A person measuring an object will place the end hook at one end of the object. Next, the person stretches out the tape measure to the opposite end of the object. The end hook of the tape measure will slip off the first end of the object. The person replaces the end hook at the first end and again stretches out the tape measure. This may be repeated several times until the person is able to obtain an accurate measurement of the object. Alternatively, the person may use a second person with each person holding one end of the tape. What is needed is an improved end hook for securing the end of a tape to an object being measured.

Frequently, a person may drop objects while working on a home improvement project, working in their garage, constructing an object such as a building or other similar activities. Some of the objects that may be dropped are screws, nails, bolts, washers or other objects. Generally these objects will fall into places where people have a very difficult time reaching them such as behind a large object or into a small opening. Recovering the object often requires climbing down a ladder to pick it up and back up the ladder to do the job. What is needed is a common device that a construction worker carries that can more easily retrieve dropped objects.

Several inventions have been designed with a magnetic attachment. Each of these, however, are of an unsound structure that would fail Federal specifications for tape measuring devices and industry standards. For instance, many of the prior art devices show the magnet substantially exposed. Magnets are known to be brittle and easily break when dropped. Test 4.4.3.2 of the Federal standards require a drop test, whereby the tape is dropped ten times from a height of five feet onto a flat steel plate to strike edgewise against the plate. The tape is then to be examined to determine if any permanent distortion of the tape which would affect the tape has taken place. Drops of this sort crack and destroy the exposed magnets of prior inventions. Other standards require the tape to be accurate to 1/32nd of an inch. Prior art magnets are of such thickness that the tape cannot be accurate. Federal standards require the tape to be extended thirty-six inches, but industry standards require the tape to be extended seven or more feet, with the tip unsupported. While extended under either standard the tape cannot bend over. Prior magnets are of size and weight that they routinely bend the tape over. Japanese standards, which American products should meet in the ever increasing world market structure, have similar tests. The aforementioned standards generally relate to Type V, classes A and B. Similar federal, trade and Japanese tests are used on other types and classes of tapes. The prior art fails to meet or provide education on how to meet the standards under the various types and classes.

What is needed is a tape measure with a magnetic tip that is sized and structured in a manner that allows the tapes to pass the drop tests, horizontal extension tests and other U.S. federal, trade and Japanese standards for performance.

SUMMARY

The present invention allows the person to measure a metal object once by placing the magnetic mechanism on the end hook of the tape measure at one end. The magnetic mechanism releasably attaches to the metal object, thus, securing it to one end of the object. The person then stretches out the tape measure and obtains an accurate measurement of the object.

The present invention further allows the user to easily pick up objects dropped into very small openings, behind large objects and otherwise difficult to reach objects. The person simply places the end hook of the tape measure onto the opening being retrieved. The magnetic mechanism will releasably attach to the dropped object. The person then retracts the tape measure and removes the dropped object from the magnetic mechanism.

The present invention has a unique structure, embedding the magnets in the tip of the tape measure. The magnets of high gauss may remain small and inserted into openings defined in the tip end. These may be set in place and a flattening force applied to the tip to hold the magnet in with friction force (adhesive, metal plating, coating, and/or welds may also be used if desired, but are not necessary), and making the magnet generally co-planer with the tip end of a tape measure. The magnet being shielded by the tip end and being small in size allow the tape to pass the drop test, horizontal extension test and the co-planer feature allows the tape to remain accurate.

In accordance with the present invention, a measuring device comprising a measuring mechanism with an end hook and a magnetic mechanism removably or permanently attached to the end hook.

DESCRIPTION OF THE FIGURES

FIG. 1 is a top view of the present invention;

FIG. 2 is a side view of the present invention;

FIG. 3A is a top perspective view of the present invention;

FIG. 3B is a bottom perspective view of the present invention;

DETAILED DESCRIPTION

Figure 4A:
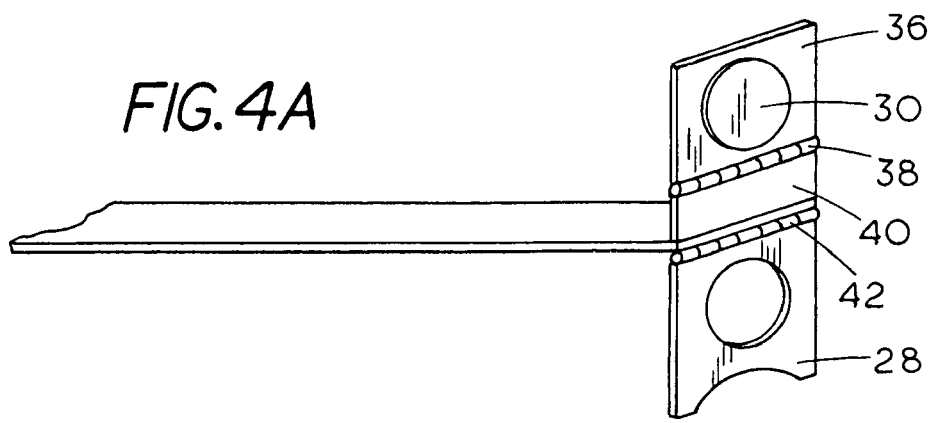
FIG. 4A is a perspective view of an embodiment of the present invention in a Type I tape.

The present inventive device 10, shown in FIGS. 1 through 3, includes a measuring mechanism 12 for measuring objects and a magnetic attraction mechanism 14 for providing a releasable attachment to objects. These mechanisms 12 and 14 are described below more fully.

The measuring mechanism 12 may be a typical tape measure or other suitable measuring device. The measuring mechanism 12 may be of a variety of lengths, widths, and shapes. The length needs to be long enough to be useful in measuring objects of a variety of sizes. The measuring mechanism 12 may include indicia using the metric system, the American system or other suitable measuring system. The length may range from shorter than six inches to longer than several hundred feet. The preferable length ranges from approximately three feet to fifty feet. The width may range from one-quarter inch to more than two inches. The preferable width ranges from approximately one-half inch to approximately one inch. The measuring mechanism 12 may be of a variety of shapes. The preferable shape is rectangular having a first end 16 and a second end 18, a right side 20, and a left side 22.

The measuring mechanism 12 may be made of any suitable material. The material needs to avoid degradation so that the measuring mechanism 12 does not break or crack during use. The weight is not overly important, although the measuring mechanism 12 preferably is a weight that is easily portable and remains within federal, trade and Japanese standards. The federal standards as used throughout this description and the claims refers to federal specification GGG-T-106F and the Japanese standards as used throughout this description and the claims refers to Japanese Industrial Standard JIS B 7512. The measuring mechanism 12 may be made of wood, hard plastic, steel, stainless steel, nylon, aluminum, or other suitable materials.

The measuring mechanism 12 may include a tape end hook 24. The tape end hook 24 may be a standard tape end hook used with typical tape measuring devices. The tape end hook 24 may vary in shape. The preferred shape is approximately rectangular. The tape end hook 24 may have an attachment end 26 and a hook end 28. The attachment end 26 and the hook end 28 may be divided by a bend 34 in the tape end hook 24.

The length, width, and material of the tape end hook 24 may vary. The length of the tape end hook 24 may range from less than one inch to more than three inches. The length preferably will be approximately one and three-fourth inches. The width of the tape end hook 24 may be approximately the same width as the measuring mechanism 12 or the width of the tape end hook 24 may be more or less than the width of the measuring mechanism 12. Preferably, the width of the tape end hook 24 will be slightly less than the width of the measuring mechanism 12. The tape end hook 24 may be made of hard plastic, steel, stainless steel, nylon, aluminum or any other suitable material.

The attachment end 26 of the tape end hook 24 may be attached near the first end 16 of the measuring mechanism 12. The first end 16 of the measuring mechanism 12 may lay adjacent to the bend 34 in the tape end hook 24. The attachment end 26 may be attached near the first end 16 using any suitable attachment mechanism such as pins or any other suitable attachment mechanism.

The tape end hook 24 may be permanently attached to the first end 16 or the tape end hook 24 may be removably attached to the first end 16. The tape end hook 24 may be removably attached using at least one snap, a hook and loop mechanism, a button and buttonhole, or other removable attachment mechanism. The tape end hook 24 may be permanently attached to the first end 16 using permanent pins, rivets, permanent glue, or other permanent attachment mechanism.

The magnetic attraction mechanism 14 may include at least one magnet 30. Preferably, the magnetic attraction mechanism 14 will include at least two magnets 30. The magnet material may be any known material that will provide a magnetic attraction including neodymium-iron-boron, samarium cobalt, alnico, ceramic ferrite or any other magnetic material. The magnetic strength may be very slight such as 2,200 gauss to very strong such as 20,000 gauss. The preferred magnet is neodymium-iron-boron of 11,400 to 13,550 gauss, with the most preferred 13,550. The magnets 30 preferably are attached to or in magnetic communication with the hook end 28 of the tape end hook 24. The magnets 30 may be attached using any suitable attachment mechanism.

The preferred embodiment has openings defined in the end hook 28 sized to receive the magnets. The magnets 30 are approximately the same thickness of the end hook 24 and the same size as the openings. The magnets 30 are situated in the holes and then pressed, friction fitting them and embedding them into the end hook 24. Embedding the magnets 30 into the openings provides sufficient structural integrity to withstand forces encountered in standard drop tests. Welds, adhesives, metal plating (which may be magnetic), coatings or other securing methods or devices may be used, but have generally been found to be unnecessary. The magnets 30 should be generally co-planer with the surfaces of the end hook 24, thus maintaining the accuracy of the tape. The magnets 30 which may vary in size, but preferably are between ⅛ inch and ½ inch in diameter and the thickness of the end hook 24 are found to be of a weight light enough that the invention 10 passes horizontal extension tests.

Figure 6:
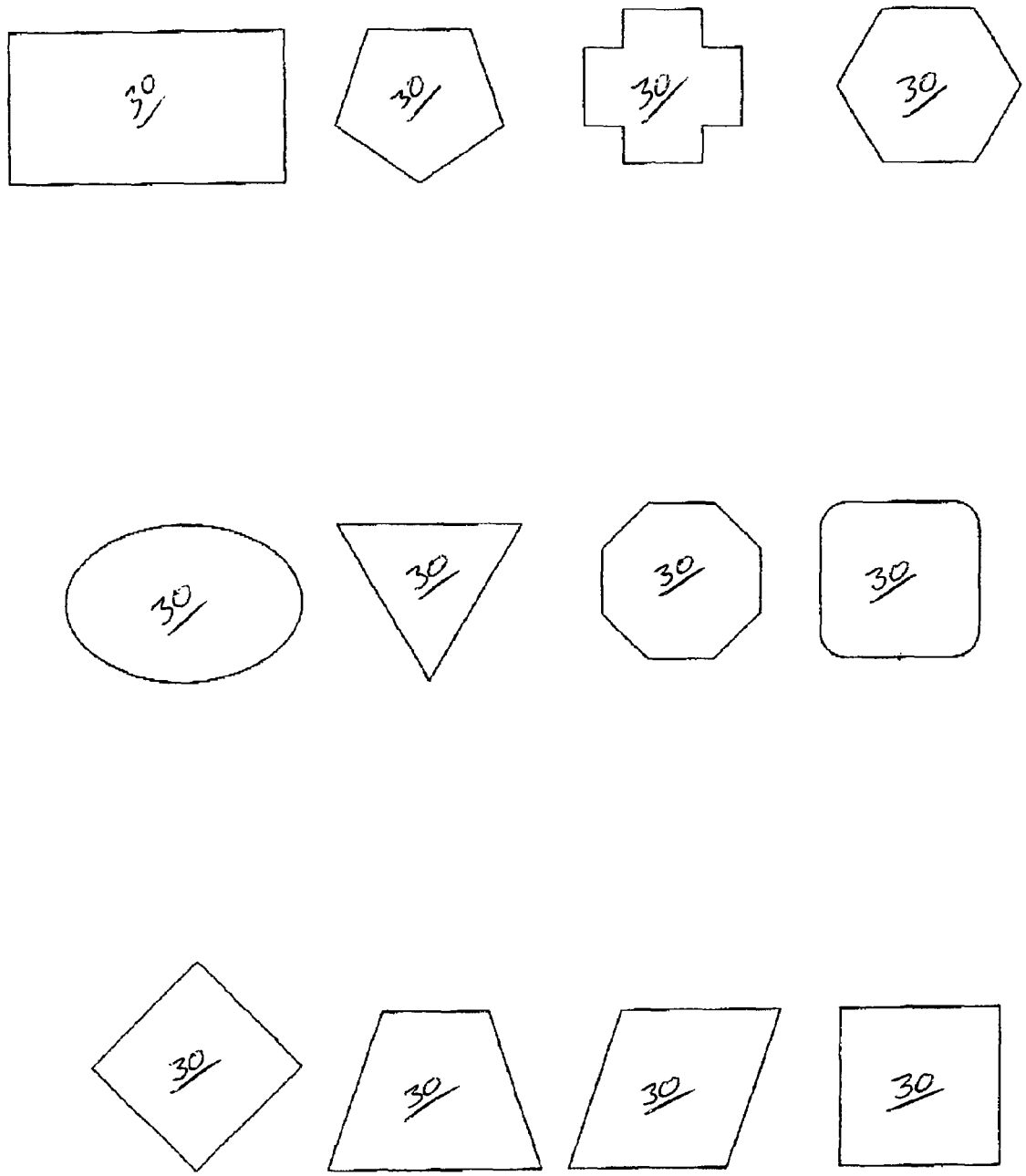
FIG. 6 is a diagram showing different shapes of the magnets 30.
Figure 7:
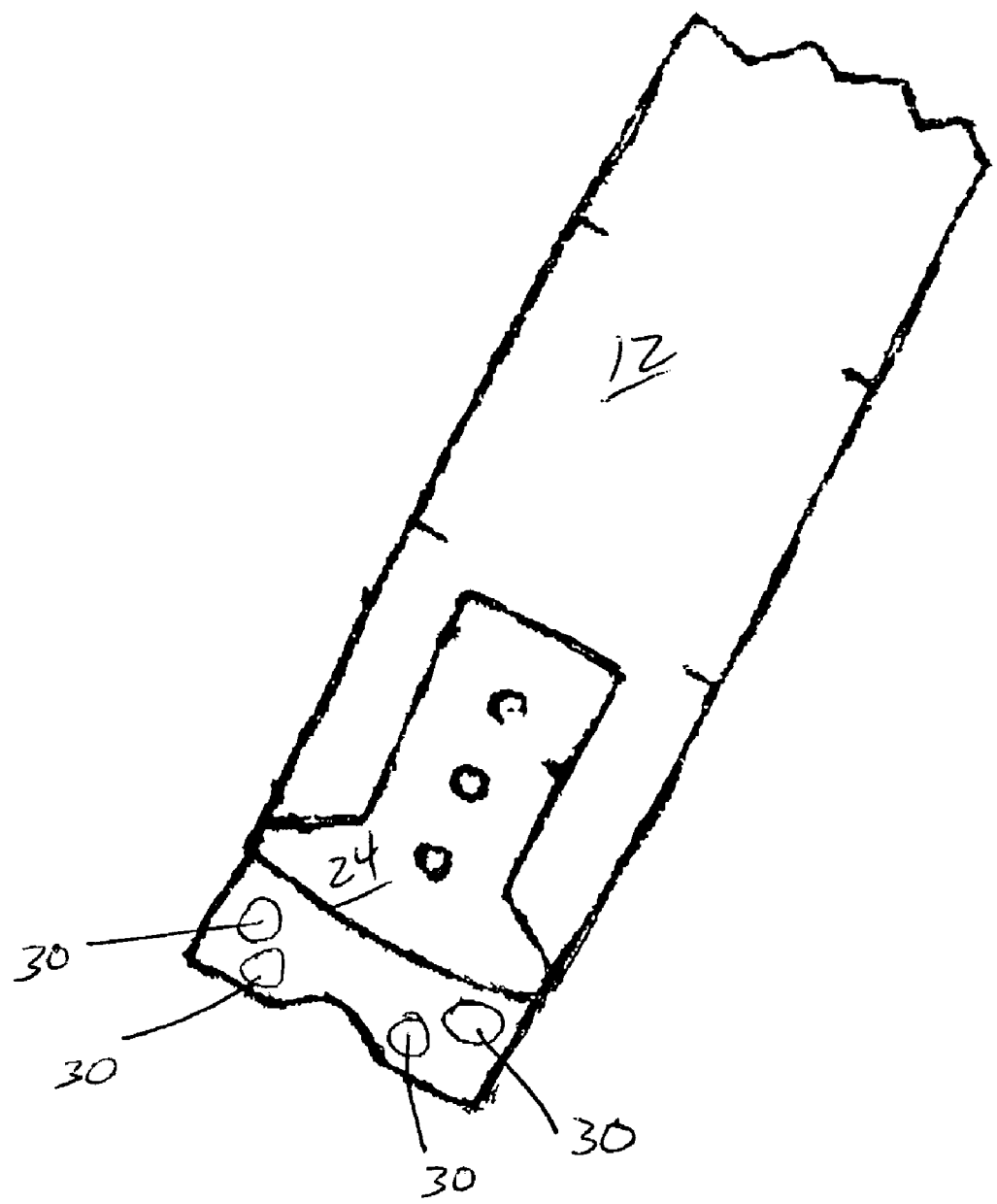
FIG. 7 is a perspective view of a tape measure with two pairs of offset round magnets.
Figure 8:
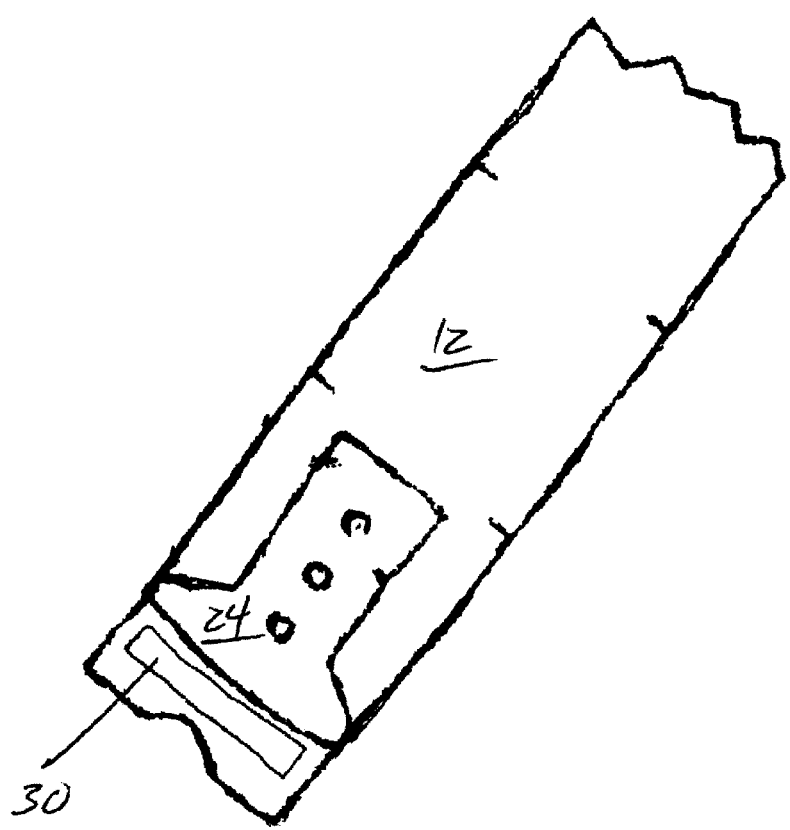
FIG. 8 is a perspective view of a tape measure with a rectangular magnet.
Figure 9:
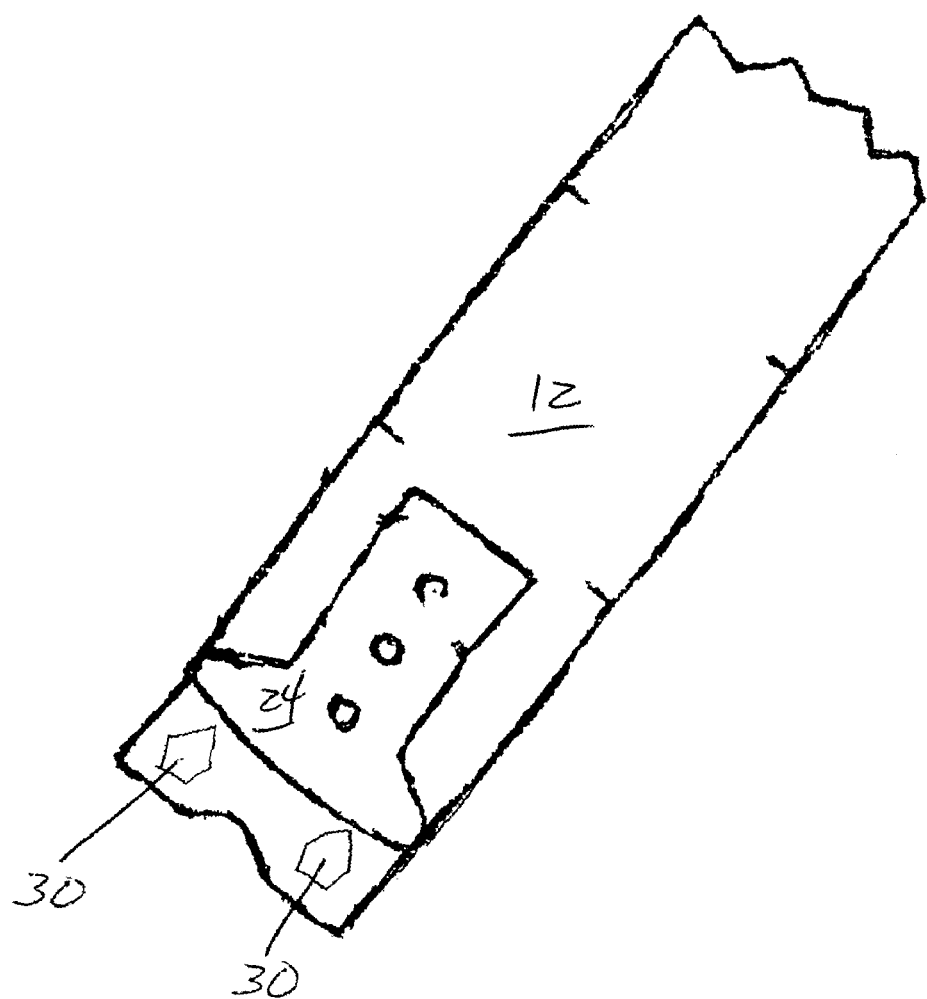
FIG. 9 is a perspective view of a tape measure with pentagonal magnets.
Figure 10:
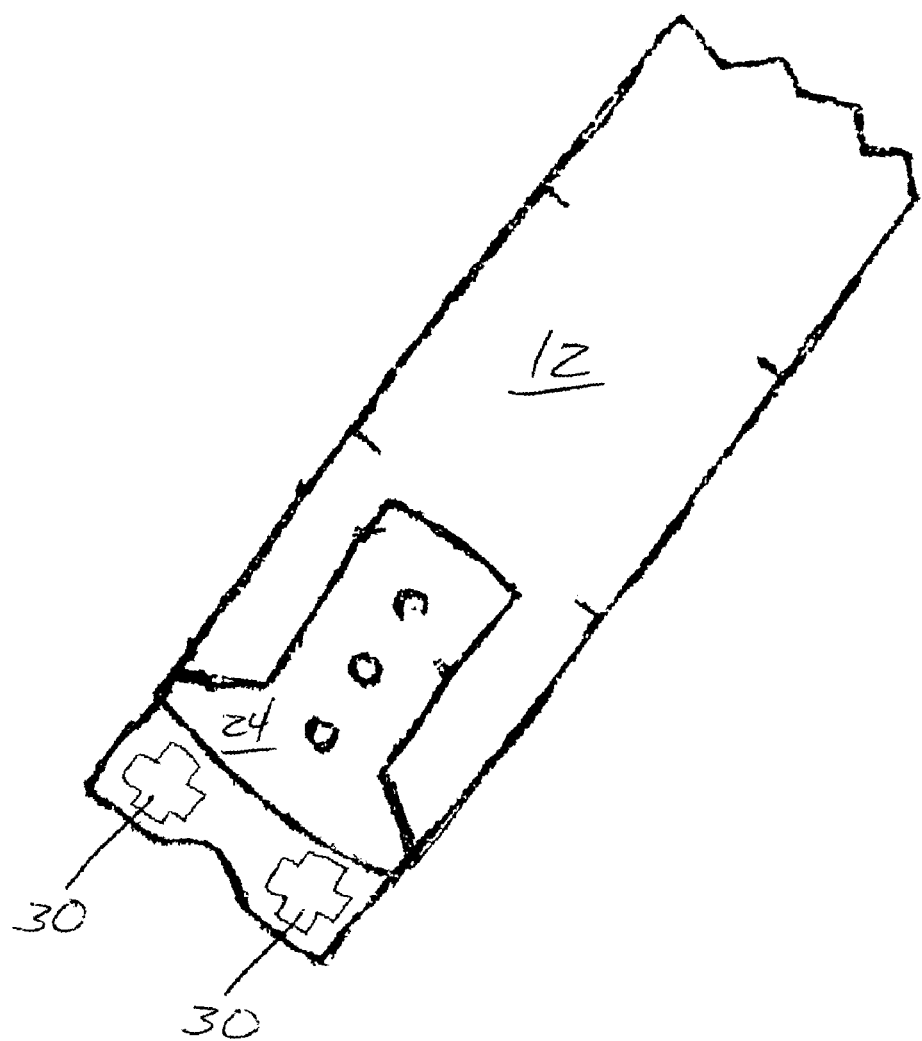
FIG. 10 is a perspective view of a tape measure with cross-shaped magnets.
Figure 11:
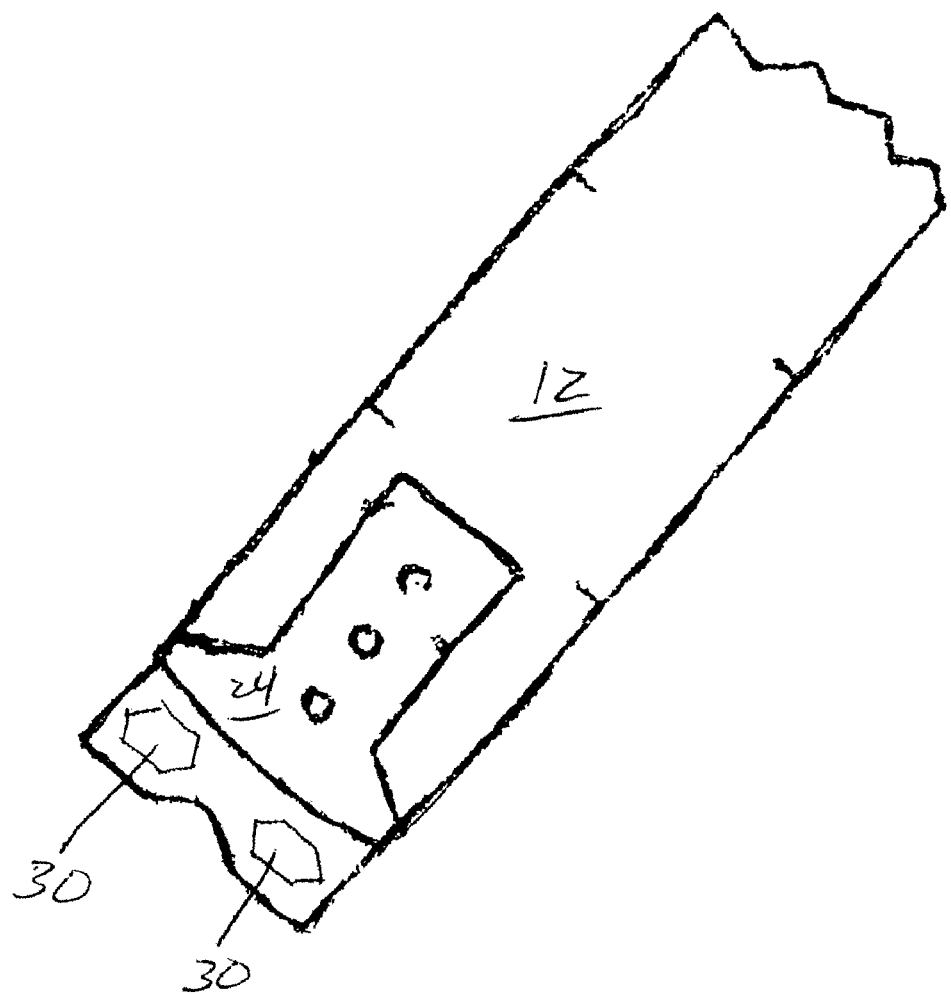
FIG. 11 is a perspective view of a tape measure with hexagonal-shaped magnets.
Figure 12:
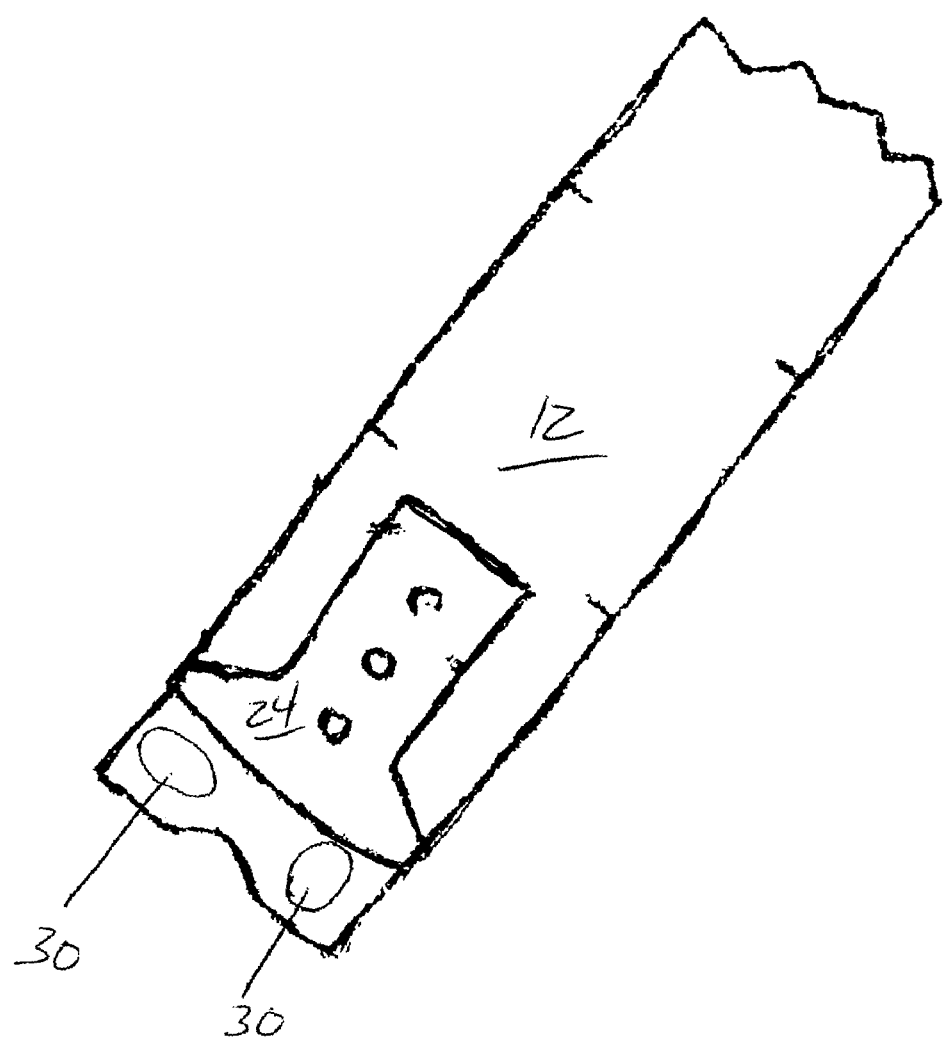
FIG. 12 is a perspective view of a tape measure with oval-shaped magnets indicating the magnets be oriented in a variety of directions.
Figure 13:
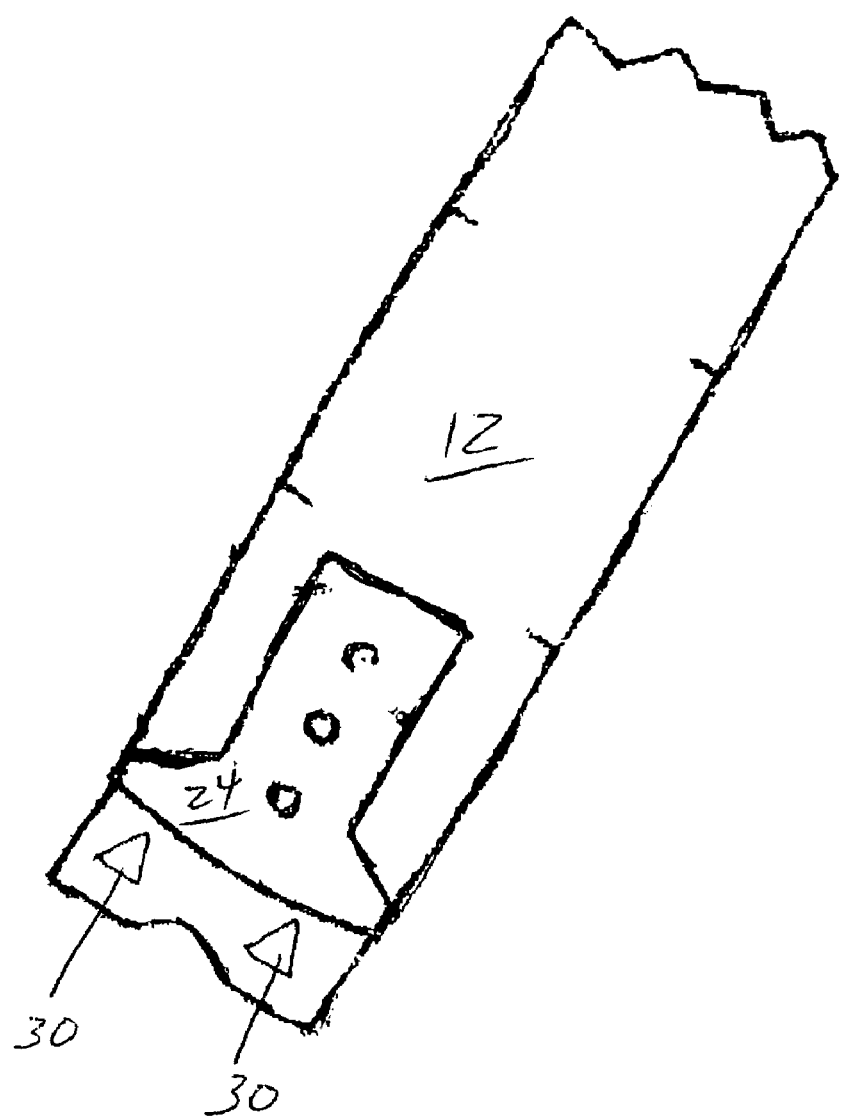
FIG. 13 is a perspective view of a tape measure with triangular-shaped magnets.
Figure 14:
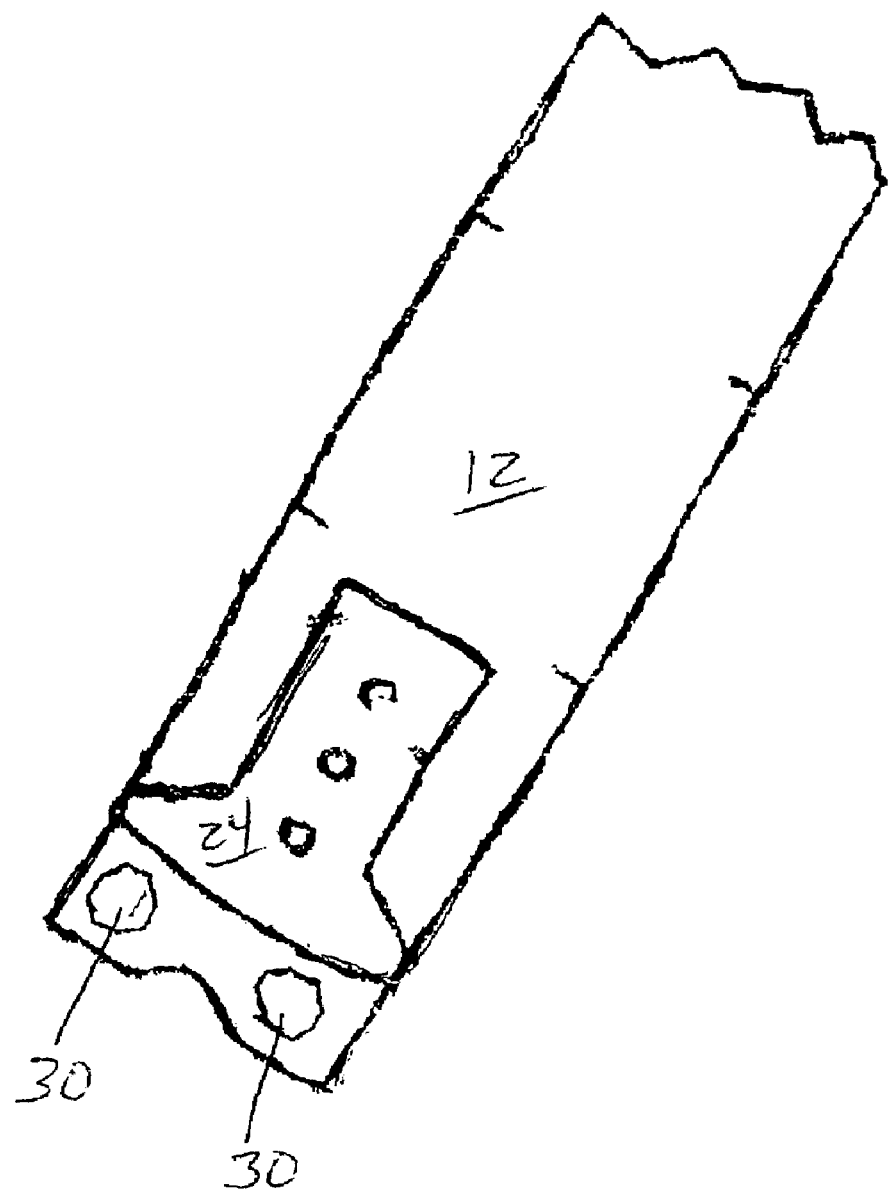
FIG. 14 is a perspective view of a tape measure with octagonal magnets.
Figure 15:
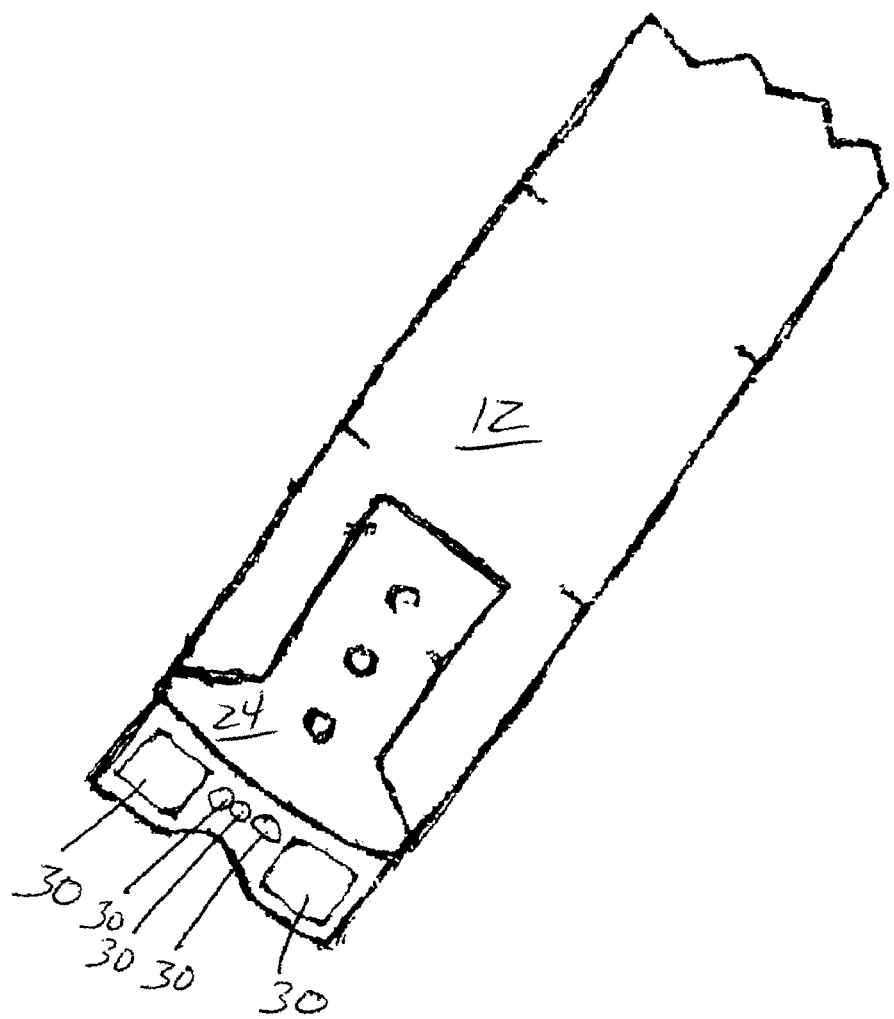
FIG. 15 is a perspective view of an embodiment of a tape measure with a pair of square shaped magnets having rounded corners and some round magnets disposed therebetween.
Figure 16:
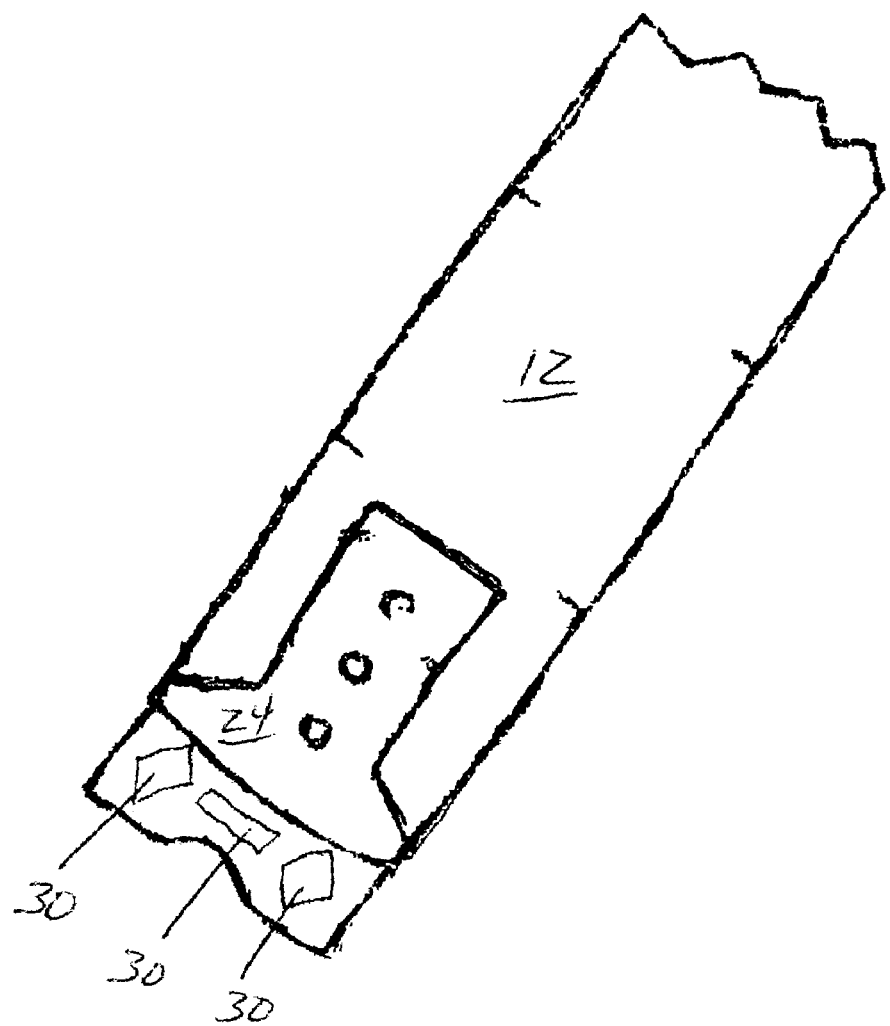
FIG. 16 is a perspective view of an embodiment of a tape measure with a pair of diamond-shaped magnets dispose on either side of a rectangular magnet.
Figure 17:
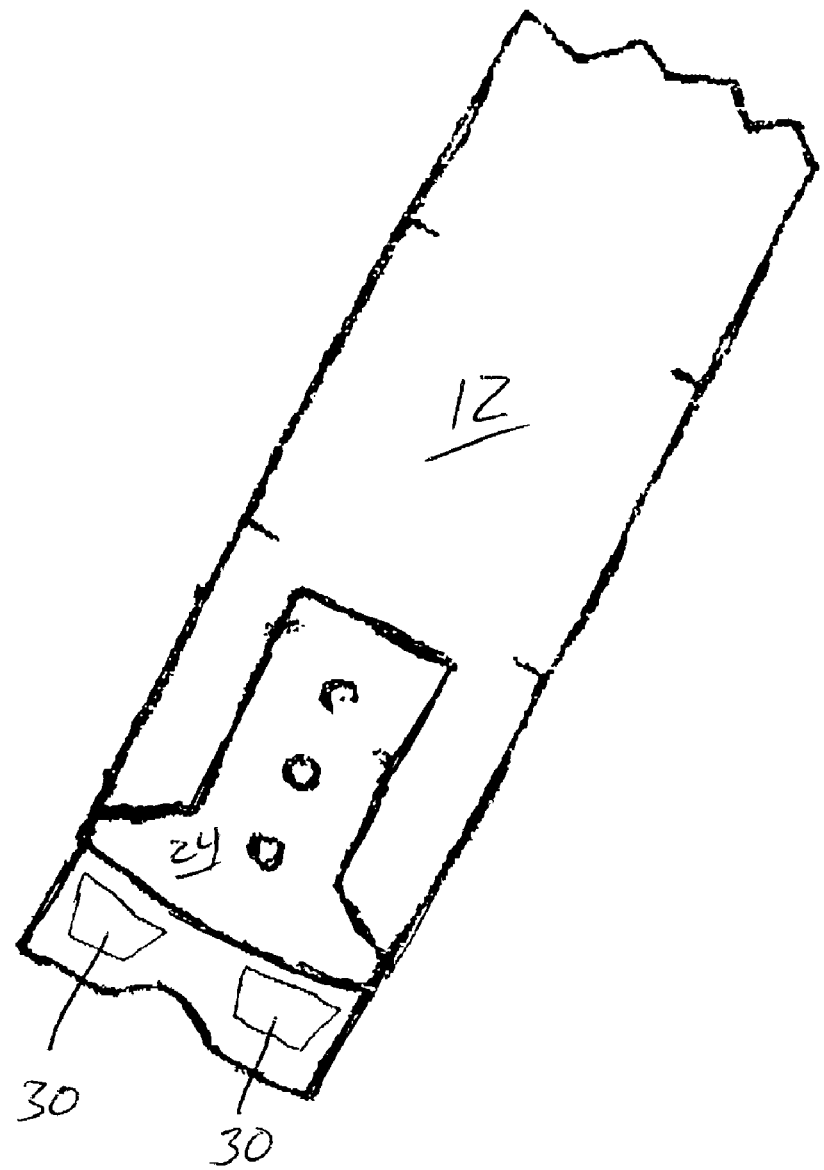
FIG. 17 is a perspective view of a tape measure with trapezoidal magnets.
Figure 18:
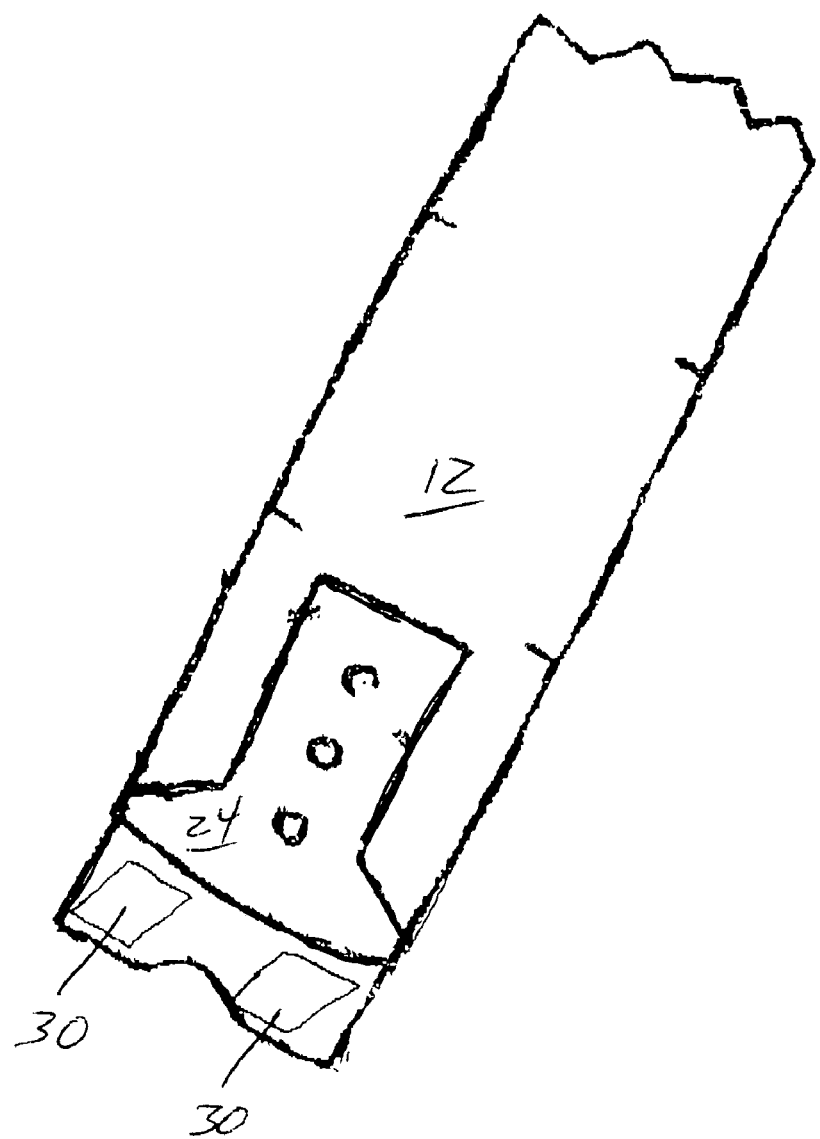
FIG. 18 is a perspective view of a tape measure with parallelogram-shaped magnets.
Figure 19:
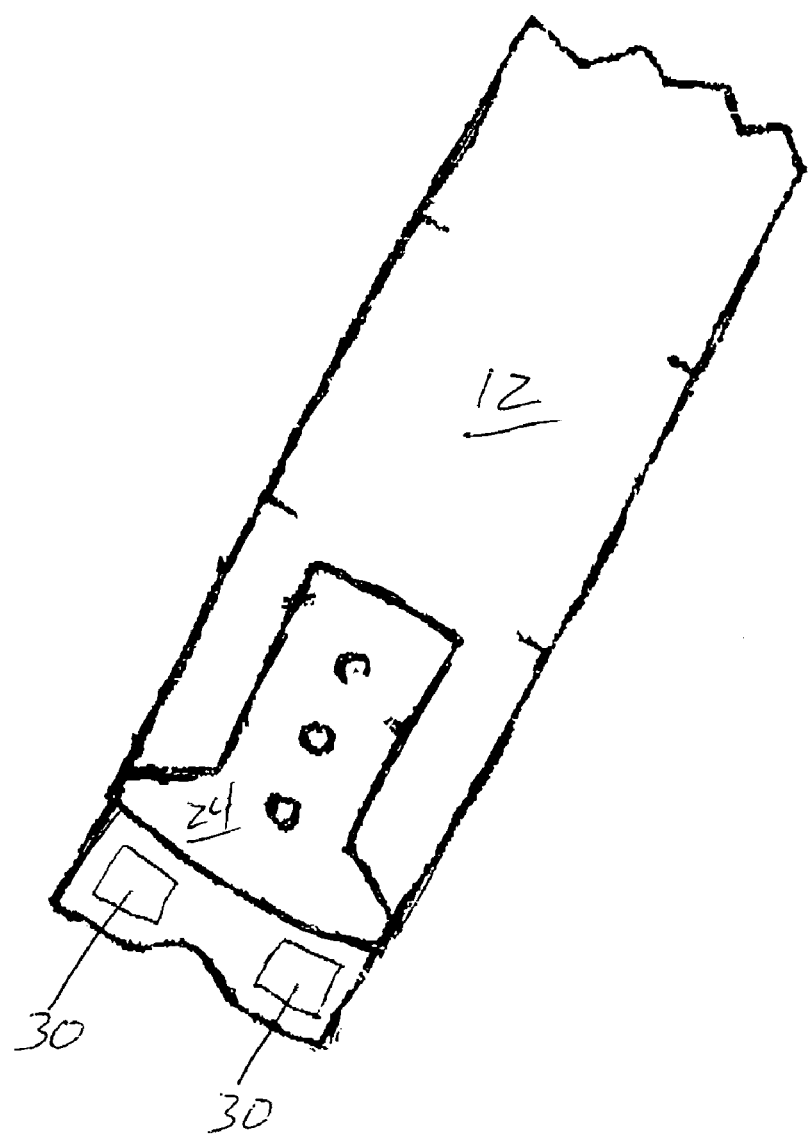
FIG. 19 is a perspective view of a tape measure with square-shaped magnets in a Type V tape.

FIGS. 6–19 demonstrate various shapes and combinations of shapes of magnets 30 may be used with the present invention. Any shape in which magnets may be obtained may be used in the present invention as shown in FIG. 6. Numerous magnets 30 may be fit in a single end hook 24 as shown in FIG. 7. As few as one magnet 30 may be joined to an end hook 24 as show in FIG. 8. The shape may be oriented as a variety of angles as shown in FIG. 12. Different shaped magnets may be used in a single end hook as shown in FIG. 15. In each end hook, the sides views are much like that shown in FIG. 2 with due adjustment for the particular shape of the magnet 30, e.g. triangular magnets 30 will have a slightly different side profile than hexagonal magnets 30. Generally, the magnets 30 of whatever shape are flat. The bottom view is reflective of that shown in FIG. 3A, e.g. the shape of the magnet 30 as seen in the front view is the shape seen in the back view.

The invention 10 is easily used. The hook end 28 is placed adjacent to any metal object, such as metal stud framing, needing to be measured. The magnets 30 are attracted to the metal object, thus, holding the hook end 28 in place. The measuring process may then be completed.

The invention 10 may also be used for reaching and removing nuts, bolts, or other metal objects located in small areas where a person may be unable to reach. This may be accomplished by using the measuring mechanism 12 to place the hook end 28 with the magnets 30 into the small area containing the metal object. The magnets 30 will attract the metal object. The hook end 28 is then lifted out of the small area using the measuring mechanism 12.

Figure 4B:
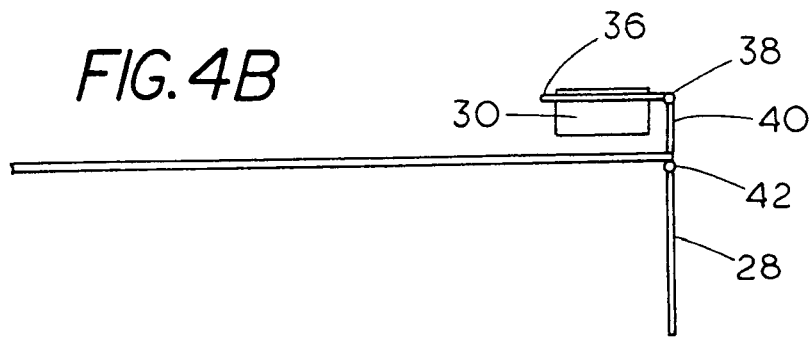
FIG. 4B is a side perspective view of an embodiment of the present invention in a Type I tape.
Figure 5A:
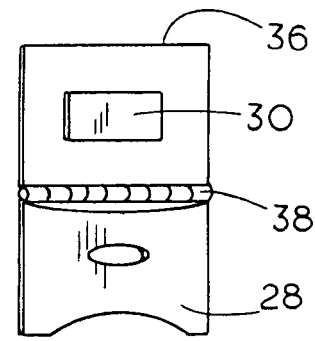
FIG. 5A is a front perspective view of an embodiment of the present invention in a Type V tape.
Figure 5B:
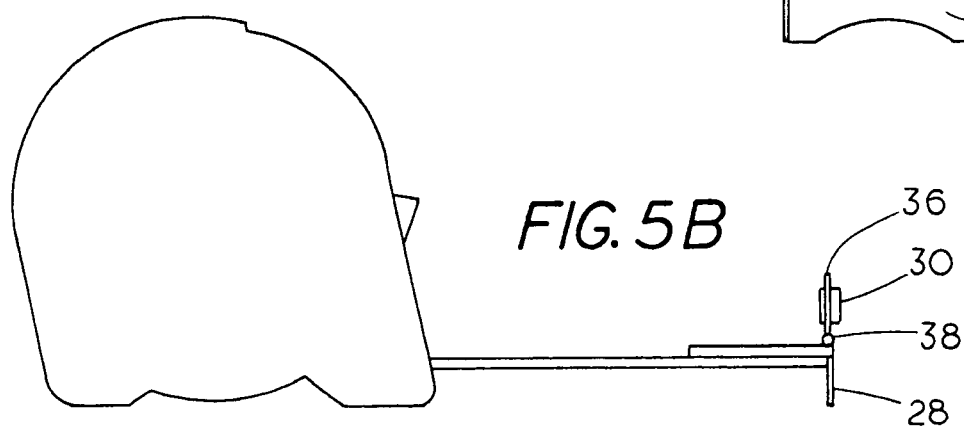
FIG. 5B is a perspective view of an embodiment of the present invention in a Type V tape.

In an alternative embodiment, the end hook 28 may include a magnet 30 embedded in a frame 36, which is joined via a hinge 38 to the end hook. FIG. 4 shows a Type 1 class A or B tape measure, which may be 50', 100', 200' or other length together with a hinged end hook 28. A segment 40 may be joined to the hinge 42 of the end hook 28 and to the hinge 38 of the frame 36. The segment 40 allows the magnet 30 to be thicker, but still should remain sufficiently thin to allow the tape to pass the applicable accuracy tests for tapes. FIG. 5 shows a Type V tape, which has a fixed angle end hook 28. The hinge 38 may join directly to the end hook 28 and the frame 36. The magnet 30 is preferably embedded into the frame 36. In this embodiment, the frame 36 and magnet 30 may be folded out of the way or down into position where they function as an end hook 28.

Although the present invention has been described with reference to preferred embodiments, workers skilled in the art will recognize changes may be made in form and detail without departing from the spirit and scope of the invention.

I claim:

1. A measuring device comprising:
    means for measuring, the means for measuring having a housing, a tape and an end hook, the end hook being joined to an end of the tape, while an opposite end of the tape is contained within the housing;
    means for magnetism, the means for magnetism being joined to the end hook, the means for measuring and means for magnetism being a standard tape measure as defined by federal specification GGG-T-106F and the means for magnetism being at least 2,200 Guass.

2. The measuring device of claim 1 wherein:
    the means for magnetism is at least one magnet.

3. The measuring device of claim 2 wherein:
    the tape measure is between three feet and one-hundred feet in length.

4. The measuring device of claim 2 wherein:
    the means of magnetism is a plurality of magnets.

5. The measuring device of claim 1 wherein the means for magnetism has a minimum residual induction Gauss of between 11,400 and 13,550.

6. A measuring device comprising:
    a tape measure having a housing joined to a tape;
    an end hook joined to an end of the tape; and
    a magnet joined to the end hook, the tape measure, end hook and magnet combination being adapted to pass the drop test, extension test and accuracy test of the Federal Specifications for Tape Measures GGG-T-106F Type V classes A and B and the magnet being at least 2,200 Gauss.

7. The device of claim 6 wherein the magnet is compression fit within the end hook.

8. The device of claim 6 further comprising a plurality of said magnets.

9. The device of claim 6 wherein the magnet has a minimum residual induction Gauss of between 11,400 and 13,550.

10. The device of claim 6 wherein the magnet is permanently attached to the end hook.

11. The device of claim 6 wherein the magnet is adapted to be selectively attachable to pipes.

12. The device of claim 6 wherein the magnet is adapted to be selectively attachable to metal wall studs.

13. The device of claim 6 wherein the magnet is adapted to be selectively attachable to iron beams.

14. A method of manufacturing a tape measure, comprising:
    providing a tape measure having a housing joined to a tape;
    defining at least one aperture into an end hook, such end hook being joined to an end of the tape; and
    joining at least one magnet within the at least one aperture such that the tape measure and magnet combination conform to the physical requirements of Federal Specification GGG-T-106F Type V class A and B (Apr. 12, 1993) and the magnet being at least 2,200 Gauss.

15. The method of claim 14 further comprising the step of:
    attaching said magnet through the end hook of a tape measure.

16. The method of claim 14 further comprising the step of:
    joining a plurality of magnets to the end hook of the tape measure.

17. The method of claim 14 wherein the step of joined, further comprises the step of compression fitting the at least one magnet within the aperture.

18. The method of claim 14 wherein the magnet has a minimum residual induction Gauss of between 11,400 and 13,550.

* * * * *